July 9, 1935. H. D. ALLEE 2,007,152

ROLLER BEARING

Filed Dec. 1, 1933

INVENTOR.
Herbert D. Allee
BY P. M. Pomeroy
ATTORNEYS.

Patented July 9, 1935

2,007,152

UNITED STATES PATENT OFFICE 2,007,152

ROLLER BEARING

Herbert D. Allee, South Bend, Ind., assignor to The Bantam Ball Bearing Company, South Bend, Ind., a corporation of Indiana Application December 1, 1933, Serial No. 700,391

4 Claims. (Cl. 308—184)

This invention relates to roller bearings and particularly to quill bearings and has for its principal object to provide in such a bearing a resilient member interposed between the rollers and the cage into which the bearing is inserted.

A further object is to provide a roller bearing having the rollers positioned within a split sleeve which is encircled by a resilient member such as rubber.

A further object is to provide a bearing adapted to be inserted between two relatively movable cylinders constructed so as to include a resilient ring or band in contact with one of the cylinders.

A still further object is to provide a bearing having its rollers interposed between a rotatable member and a split sleeve and having a resilient sleeve interposed between the split sleeve and a fixed casing.

Another object is to provide a bearing including a resilient member which will compensate for any irregularities existing between the inner race member and the cage encircling the bearing.

Still another object is to provide a bearing having an inner race member, rollers encircling the race member, a split sleeve forming an outer race member for the rollers, a resilient ring or band encircling the split sleeve, and a casing encircling the resilient band.

In addition to the above objects, my invention includes the further objects relating to details of construction and methods of manufacture which will be apparent from the detailed description to follow.

Many instances where quill roller bearings have been used, the bearings would either fail or have short life due to irregularities existing between the cage and inner race member, due to the fact it is extremely difficult to so accurately position those parts that they are concentric to permit free rotation of the rollers. I have overcome those disadvantages by providing resilient means between the rollers and the cage to compensate for such irregularities and, therefore, have materially lengthened the life of the bearing as the rollers are permitted to adjust themselves to such variations.

Figure 1:
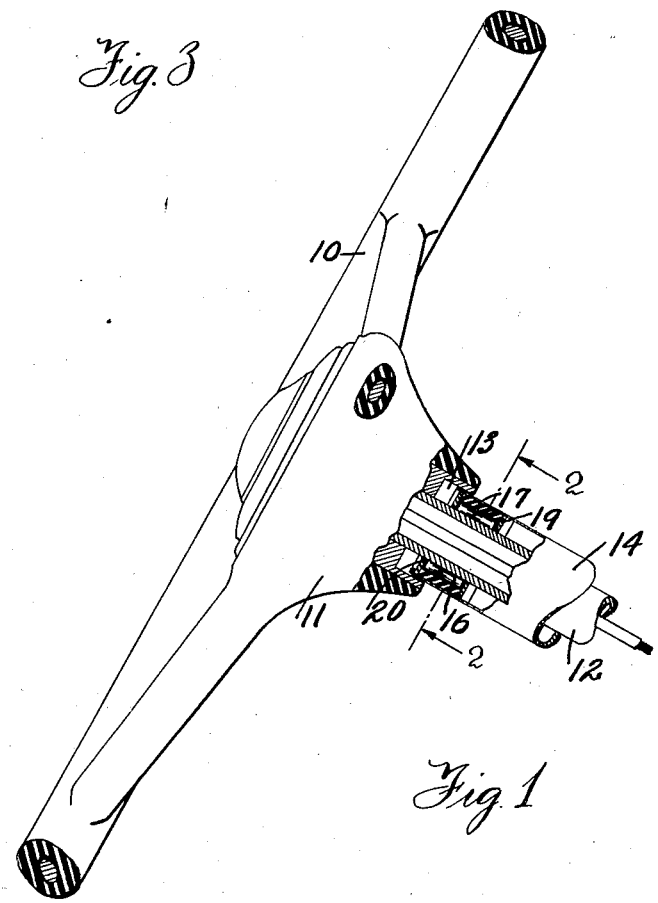

In the drawing in which like numerals refer to like parts throughout the several views, Fig. 1 is a fragmentary side elevational view of a steering wheel assembly for automotive vehicles, certain of the parts being broken away to better illustrate the invention.

Figures 2, 3:
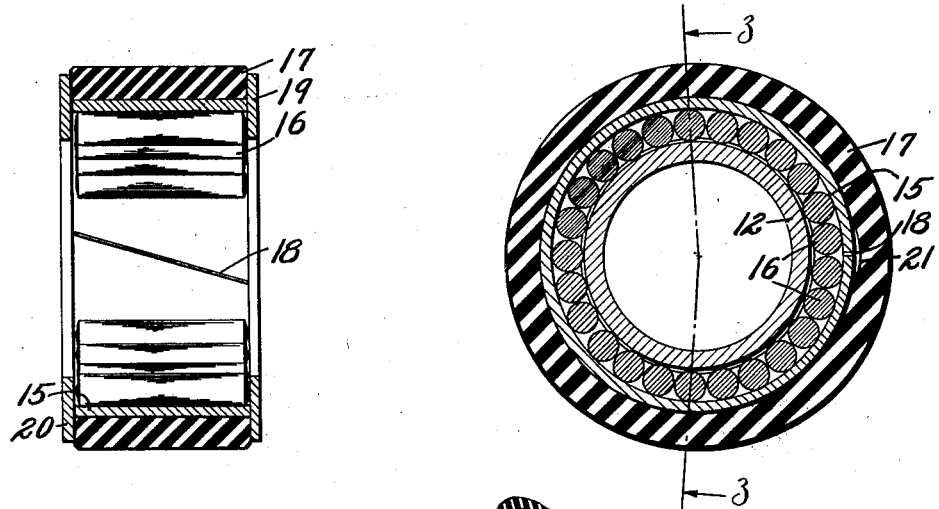

Fig. 2 is an enlarged transverse sectional view taken on the line 2—2 of Fig. 1, and Fig. 3 is a detailed sectional view taken on the line 3—3 of Fig. 2, certain of the rollers being omitted to better illustrate the invention.

For the purpose of illustration, I have shown my improved bearing as used in connection with steering mechanism suitable for use on automotive vehicles although it is to be clearly understood that the same is not restricted to such use but that the same may find utility in a large number of places where it is desirable or expedient to interpose a resilient member between the rollers and the supporting cage for the bearing.

I have illustrated a steering wheel 10, having a hub 11 in which may be secured a steering shaft 12 in any suitable manner so that the shaft will rotate with the steering wheel. Encircling the shaft 12 and extending into a recess 13 formed in the hub 11 is a fixed column or casing 14 which is usually held against rotation in a bracket extending from the instrument board of the vehicle or from the floor board thereof or from any other source as is well known to those skilled in the automotive art and which need not be described in detail as the securing means forms no part of my invention.

The bearing comprises a split sleeve 15 which encircles a plurality of rollers 16 that are rotatable relative to the steering shaft 12, which is illustrated as forming the inner race member. Encircling the split sleeve 15 is a resilient ring 17 formed of any suitable material such as live rubber, the same preferably being vulcanized to the split ring 15 except adjacent to the split ends 18 thereof. Retaining rings for the rollers 16 are illustrated in Fig. 3 and comprise disks 19 and 20 positioned at the opposite edge faces of the split ring 15 for retaining the rollers against longitudinal movement. These retaining rings 19 and 20 may or may not be vulcanized to the resilient ring 17 depending upon the use to which the bearing is put.

As the outer casing 14 and the steering shaft 12 are not always concentric and as either or both of them may not have perfect cylindrical contours, it will be readily understood that the split ring 15 will be permitted to expand or contract due to the resiliency of the ring 17 interposed between the split ring and the casing to overcome any irregularities between the shaft, which in the present illustration forms the inner race way for the bearing, and the fixed casing. As illustrated, the shaft 12 forms the inner race member but it will be understood that my invention is not to be so limited, as I contemplate the use of any suitable cylindrical inner race member and an expansible outer race member.

In Fig. 2, I have shown in exaggerated form as at 21, the ring 17 as pulled away from the split ring 15 adjacent to the ends 18 thereof, the same being the portion that is not vulcanized to the ring 15. In practice, the ring 17 will lay against the split ring 15, but it is illustrated as out of contact therewith merely to show the part that is not vulcanized. It will be evident that it is desirable not to vulcanize the band 17 to the split ring 15 adjacent to the ends 18 to thus permit stretching of the band and to prevent its tearing away from the split band at this point. In practice, I have found that in a bearing having an outer casing of about two inches in diameter, the ring or band 17 is left unvulcanized for about one-quarter of an inch on each side of the ends 18 of the split ring 15.

In the manufacture and assembly of the bearing, the rubber ring 17 is vulcanized to the split ring 15 and then this assembly is inserted in the casing 14. The rubber ring 17 normally is of somewhat greater diameter than the casing so that it is compressed therein. Also, the split ring 15 is normally somewhat smaller in diameter than the distance around the rollers 16. The rollers 16 are then inserted in the split outer race member or ring 15 after which the assembly is inserted on the inner race member. Due to the compression of the rubber ring 17 and the expansion of the split ring 15, the latter will be caused to always contact with each of the rollers 16 and cause them to always contact with the inner race member regardless of any irregularities which may exist between the race members or between the race members and the casing.

It will, of course, be understood that if desired the parts may be reversed and the inner member may be stationary and the outer member rotatable in which case the positions of the rollers, split ring and resilient band, would be reversed from that shown but without in any way changing the function, operation or operativeness of the device.

While I have described at some length the bonding together of the split ring and the resilient band, in some cases I have also found that equally good results may be obtained by inserting the resilient band over the split ring and not bonding them together.

Also, it will be evident to those skilled in the art that various changes in details of construction, proportion of the various parts, and method of operation, and also substitution of equivalent parts, may be resorted to without departing from the spirit and substance of my invention, the scope of which is to be measured entirely by the sub-joined claims.

What I claim is:

1. A roller bearing comprising, an inner race member, an expansible outer race member, rollers interposed between said race members, roller retaining members abutting against the edge faces of said outer race member to form a pocket outwardly of said race member, a rubber ring in said pocket bonded to said outer race member and to said retaining members, and a casing enclosing said rubber ring.

2. A roller bearing comprising, an inner race member, rollers encircling said race member, a non-rotatable split outer race member expanded around said rollers, roller retaining rings extending outwardly and inwardly from said outer race member abutting against the opposed edge faces thereof, a fixed casing, and a rubber ring interposed between said outer race member and said casing bonded to said race member and retaining members.

3. A roller bearing comprising, an inner race member, rollers encircling said race member, a split outer race member having a normal inner diameter less than the distance around said rollers expanded therearound, a casing, and a rubber ring maintained under compression between said outer race member and casing to contract and maintain said outer race member against rotation and cause metal-to-metal contact between said inner race member, rollers and outer race member.

4. A roller bearing comprising, an inner race member, rollers encircling said race member, a split outer race member having a normal inner diameter less than the distance around said rollers expanded therearound, a casing, and a rubber ring bonded to said outer race member except adjacent to the split therein to permit stretching of said ring without tearing the same adjacent to said split, said rubber ring being maintained under compression between said outer race member and casing to contract said outer race member to thereby maintain metal-to-metal contact between said inner race member, rollers and outer race member.

HERBERT D. ALLEE.